INVENTOR
HEINRICH HENSS
ATTORNEY.

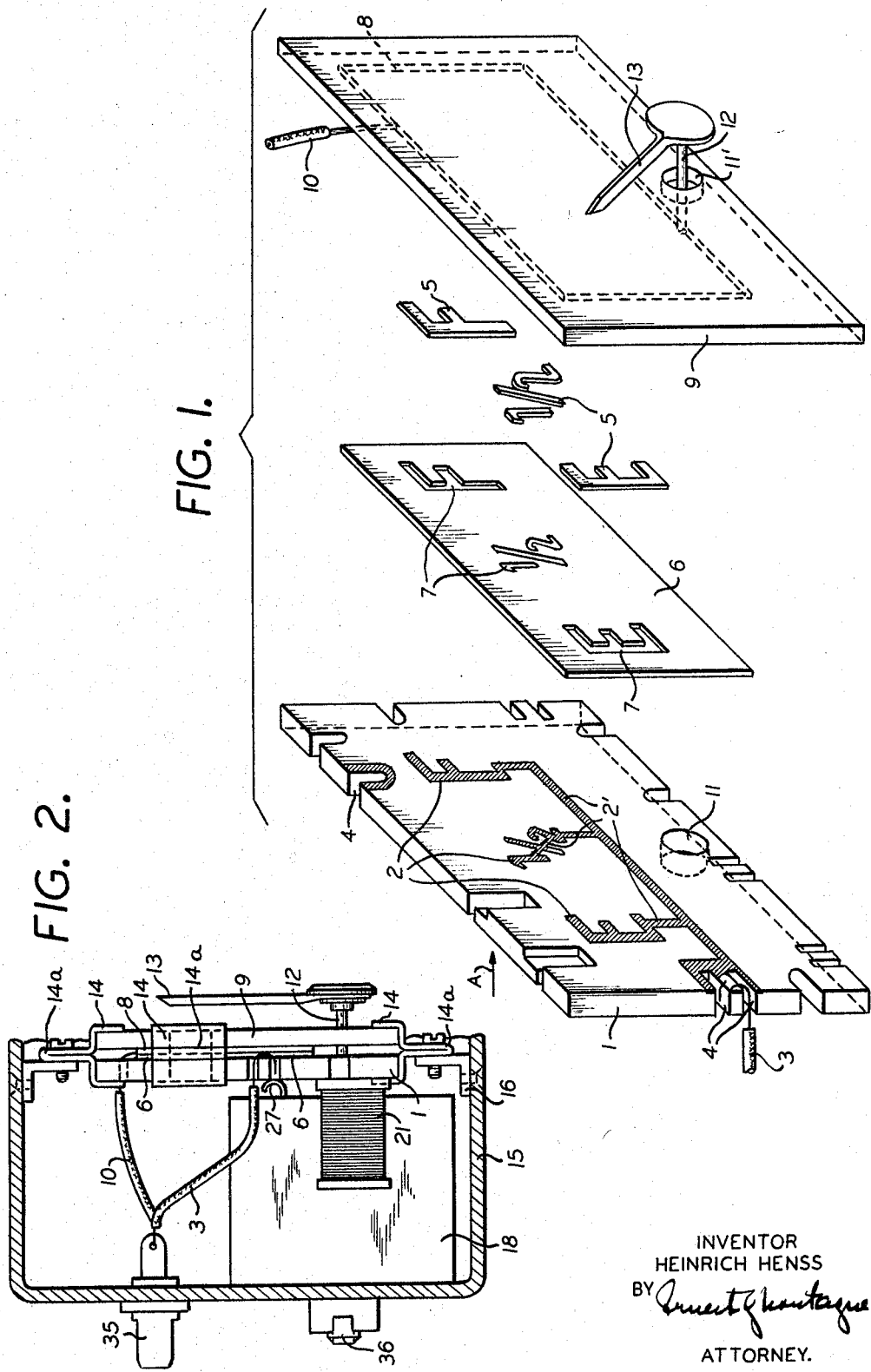

United States Patent Office 3,287,641
Patented Nov. 22, 1966

3,287,641
ELECTRIC MEASURING INSTRUMENT WITH A PRINTED CIRCUIT AND ELECTROLUMINESCENT SCALE
Heinrich Henss, Oberhochstadt, Taunus, Germany, assignor to VDO Tachometer Werke Adolf Schindling G.m.b.H., Frankfurt am Main, Germany, a corporation of Germany
Filed Jan. 16, 1963, Ser. No. 251,927
Claims priority, application Germany, Jan. 19, 1962, V 21,912
6 Claims. (Cl. 324—122)

The present invention relates to an indicator for measuring instruments with a pinted circuit on a carrier plate of insulating material having an electroluminescent dial.

It is already known, to manufacture the marks of the dial in measuring instruments of electroluminescent material and to arrange them between two surface electrodes interposing an insulating-layer or -plate between the latter. Separate from this type of dial design it is also known, to design the electric wiring of measuring instruments as a conductor network on an insulating plate in form of a so-called printed circuit and to install the measuring mechanism and the circuit elements on the insulating plate.

It is one object of the present invention to provide an indicator for measuring instruments with a printed circuit, which combines these two construction elements of a measuring instrument and improves furthermore the design of the electroluminescent dial.

It is another object of the present invention to provide an indicator for measuring instruments with a printed circuit, wherein the dial of the measuring instrument is connected with the carrier plate of the printed circuit and wherein the marks of the dial are attached in a form of indicia directly or indirectly to the outer visible side of the carrier plate in form of an already known electroluminescent layer between two electrodes. In order to simplify the manufacture and assembly, in addition a non-transparent electrode is attached directly to the carrier plate in form of dial marks electrically connected with each other also as a printed circuit. It is followed by a layer, or the indicia dial marks only, made of electroluminescent material and finally a second transparent electrode is provided, under certain circumstances after an interposed insulating layer. The indicia dial marks of electroluminescent material can be printed on the likewise printed indicia dial mark electrode and the insulating layer can be printed on the carrier-plate with or without leaving the dial marks out.

It is still another object of the present invention to provide an indicator for measuring instruments with a printed circuit, wherein, according to another modification, a thin non-transparent plate of insulating material in the desired color of the dial may be used for insulation of the two electrodes. In this plate the dial marks are left out and the recesses are filled with electroluminescent material.

The measuring mechanism and the circuit elements of the measuring instrument are supported by and on the side of the carrier-plate with the printed circuit. In a special modification of the present invention, in which the carrier-plate represents the supporting part of the measuring instrument, it is of advantage to join the frame of the dial and the casing of the measuring instrument to the carrier-plate and to manufacture this part integrally in one piece of plastic in a die-casting process.

The special advantage of the present invention resides in the fact that the printed circuit of a measuring instrument is combined with an electroluminescent dial on a common carrier plate and that the indicia dial mark electrode is likewise designed as printed circuit on the same plate of insulating material on the opposite face of the carrier plate, which facilitates manufacture and assembly on such measuring instruments in large numbers. Another advantage presents itself in the fact that a comparatively small connected load for the electroluminescent dial is present, as only the field of the connecting lines between the indicia dial marks of the mark electrode represents a loss of power, which is not converted into a luminous effect.

With these and other objects in view, which will become apparent in the following detailed description, the present invention will be clearly understood in connection with the accompanying drawings, in which:

FIGURE 1 is a perspective, exploded front view of the electroluminescent dial on the carrier-plate of the printed circuit made of insulating material;

FIG. 2 is a side elevation of the carrier-plate with the installed measuring mechanism in an instrument casing shown partly in section;

Figure 4:
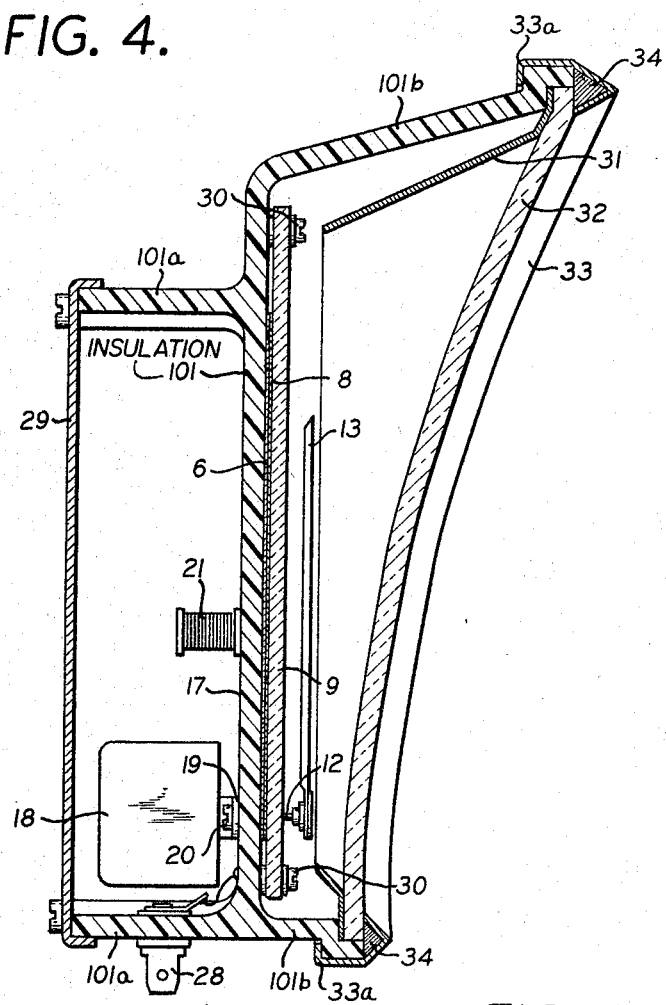
FIG. 4 is a cross-section of the indicator, disclosing a special modification of the carrier-plate with the casing and the frame of the dial formed integrally of one piece.

Referring now to the drawings, and in particular to FIG. 1, the indicator comprises a carier-plate 1 of insulating material having on one face thereof the printed circuit of the measuring instrument, the carrier-plate 1 being the main part of the measuring instrument. The measuring mechanism and the circuit elements of the instrument are supported by and on that side of the carrier-plate 1, on which the printed circuit is provided (see FIGS. 2 and 3), while the opposite side of the carrier plate 1 carries the indicia dial marks or is directly designed as electroluminescent dial, as shown in the specific embodiment of the present invention. One electrode of the electroluminescent layer is formed by the dial marks 2, which are electrically connected with each other by the lines 2' and applied to the insulating carier-plate 1 together with the connecting lines 2' in the form of a printed circuit. The indicia dial mark 2 and the connecting lines 2' are electrically connected with the corresponding contacts through bores in the carrier-plate 1 or the connection line 3 may be fed into the marginal grooves 4 and soldered to the connecting line 2' of the electrode as shown in FIG. 1.

The indicia dial marks 5 of electroluminescent material and an insulating layer 6 are atached to the electrode 2, 2' in a known manner, preferably in the form of a printed circuit. The insulating layer 6 may be arranged as a complete, transparent layer in front of or behind the marks 5. It is, however, likewise possible to provide the layer 6 with recesses corresponding to the marks 5, so that the latter are surrounded by it. A third possibility is, to manufacture the insulating layer 6 as a thin non-transparent plate in the color of the dial and to insert the marks 5 made of electro-luminescent material into the recesses 7.

The second electrode is arranged, in a known manner, in front of the insulating layer 6 and of the marks 5 as a transparent conducting layer 8 on a plate 9 of transparent material, for instance glass. The electric lead 10 to the second electrode may also be led to a connection point on the side of the printed circuit of the carrier-plate 1. The axle 12 of the measuring mechanism, which carries the pointer 13 moving in front of the electroluminescent dial 5, extends through a bore 11 of the carrier-plate 1 carrying the dial and through a corresponding aligned bore 11' of the transparent plate 9.

Referring now to FIG. 2, the carrier-plate 1 is shown in an end view. The insulating layer 6 with the electroluminescent indicia dial marks 5, which are not visible in FIG. 2, is arranged between the carrier-plate 1, having the printed mark electrode 2, 2', and the transparent cover plate 9, having the surface electrode 8. The plates 1 and 9 are kept together on either side by any suitable means, as for instance, by spring clamps 14. Link-shaped extensions 14a of these spring clamps 14 serve the purpose of securing the insulating plate 1 carrying the dial and the measuring mechanism inside a casing 15 by screwing them to square elbows 16, which in turn are secured to the casing 15.

Figure 3:
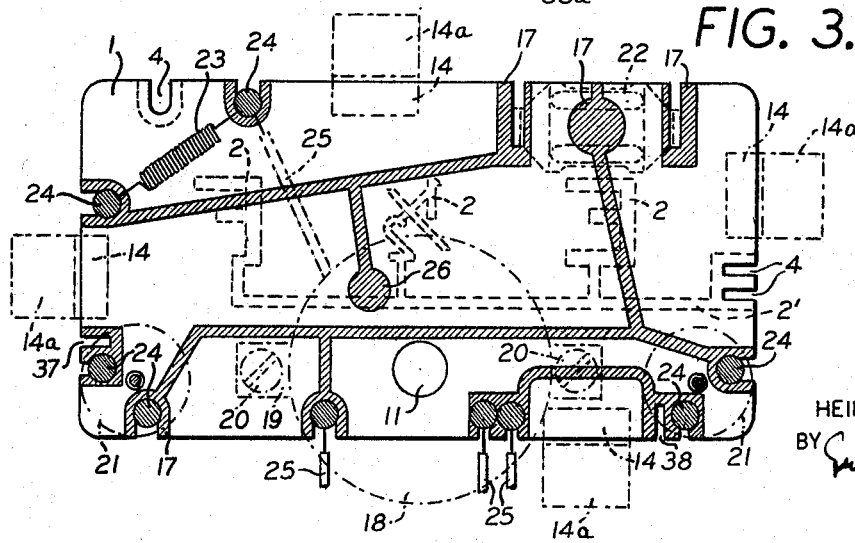
FIG. 3 is a front elevation of the carrier plate with the conductor network of the measuring circuit.

Referring now to FIG. 3, a view is disclosed in the direction A of FIG. 1 to the rear face of the carrier-plate 1 with the conductor network 17 of the printed circuit of the measuring mechanism. The electric measuring mechanism, for instance a known rotary magnet mechanism, and its circuit elements are of conventional nature and well known, and, therefore, not an object of the present invention. The measuring mechanism, which is disposed in a screened housing 18, is indicated schematically in FIGS. 2, 3 and 4. A fitting 19 is rigidly secured to the housing 18 and the measuring mechanism is attached to the carrier-plate 1 by means of screws 20 extending through the fitting 19. The measuring elements, namely the housing 18, the fitting 19 and the screw 20, as well as the circuit elements of the measuring circuit as the resistances 21, the rectifier 22 and the resistance 23 are represented schematically in FIG. 3 by dash-dotted lines and all these elements are likewise secured to said carrier plate. In FIG. 2 they are partly shown in full views. The points 24 in FIG. 3 indicate the soldered joints of the circuit elements and the measuring mechanism with the conductor network 17 of the printed circuit. The connecting lines 25 between the terminals of the conductor network 17 and the coils of the measuring installation are also indicated. The coils are inside the screened housing 18 and thus not shown in the drawing. The ground connection 26 of the measuring circuit is shown in FIG. 3. On the ground connection 26 sits a contact spring 27 (FIG. 2). The terminals of the measuring circuit connecting the latter with the conductor network of the printed circuit are placed in known manner in marginal grooves of the carrier-plate 1. The connections of the measuring circuit leading thereto from the outside are disposed in the groove 37 feeding the supply voltage and in the groove 38 feeding the measuring voltage, the leads being not shown. The mark electrode 2 of the electroluminescent dial, which is applied to the rear side of the carrier-plate 1 in form of a printed circuit, is shown as dotted lines in FIG. 3.

The connections around the marginal grooves 4 in the carrier-plate 1 for the electrodes 2 and 8 of the electroluminescent dial are insulated from the conductor network 17 of the measuring circuit. The lines 3 and 10 (FIG. 2) leading from the electrodes 2 and 8 to the contact plug 35 for the electrode voltage are shown in FIG. 2. Furthermore the housing 18 with the measuring mechanism is fixed to the bottom of the carrier plate 1 by means of a screw bolt 36, which serves at the same time as ground connection.

Referring now to FIG. 4, a special further development of the present invention is disclosed. The casing 101a of insulating material receiving the measuring mechanism and also the frame 101b of the dial are formed integrally as one piece with the insulating plate 101. The conductor network 17 of the measuring circuit is again attached to the casing-side of the insulating plate 101 and the measuring mechanism 18 and the circuit elements, as the resistance 21, are fixed to the conductor network 17. The feed for the measuring circuit and the electrode voltage of the electroluminescent dial is brought about by means of a connection plug 28 secured to the wall of the casing 101a. The casing 101a receiving the measuring instrument, is closed up by a cover 29.

The mark electrode 2, the dial marks 5 of electroluminescent material and the insulating layer 6 are disposed at the front of the insulating plate 101. The transparent plate 9 with the surface electrode 8 is placed in front of the insulating layer 6 and secured to the plate 101, as indicated by a screw 30. A frame diaphragm 31 is inserted into the frame 101b and the instrument is closed towards its front by a cover glass 32. The frame diaphragm 31 and the cover glass 32 are retained in the frame 101b by means of a front ring 33, a rubber insert 34 being interposed between the front edge of the frame 101b and the front ring 33, for the purpose of sealing up the frame 101b. The front ring 33 is secured to the frame 101b by a clamping flange 33a.

While I have disclosed several embodiments of the present invention, it is to be understood that these embodiments are given by example only and not in a limiting sense, the scope of the present invention being determined by the objects and the claims.

I claim:

1. In an indicator for measuring instruments having a dial,
   a carrier plate of insulating material,
   an electric measuring mechanism including a conductor network printed on one face of said carrier plate, to form a first printed circuit, and
   said mechanism and circuit elements thereof being supported on said one face of said carrier plate,
   an electroluminescent dial secured to the other face of said carrier plate and comprising indicia dial marks forming a first electrode printed on said other face of said carrier plate, to form a second printed circuit, and said dial marks being electrically connected by printed connecting lines to energizing means,
   a second transparent electrode disposed opposite said first electrode and connected to said energizing means,
   an electroluminescent layer forming indicia dial marks overlying said first-mentioned indicia dial marks,
   said electroluminescent dial marks being disposed between said first and said second electrodes, and
   pointer means movable by said mechanism across said electroluminescent dial.

2. The indicator, as set forth in claim 1, wherein said marks are disposed slightly spaced apart from said other face of said carrier plate by an insulating layer.

3. The indicator, as set forth in claim 2, wherein said insulating layer has recesses complementary to and receiving said marks in said receses, so that said second electrode engages simultaneously said transparent layer and said electroluminescent marks.

4. The indicator, as set forth in claim 1, wherein said electroluminescent marks engage said second printed circuit, and said second electrode engages said electroluminescent marks.

5. The indicator, as set forth in claim 1, wherein said electroluminescent marks are printed on said first electrode, and a transparent insulating layer is printed on said electroluminescent marks.
6. The indicator, as set forth in claim 1, which includes
a frame surrounding said dial and projecting forwardly from said carrier plate,
a casing adapted to receive said measuring mechanism and projecting rearwardly from said carrier plate, and
said frame and said casing being integral with said carrier plate.

References Cited by the Examiner

UNITED STATES PATENTS

| | | | |
|---|---|---|---|
| 2,858,632 | 11/1958 | Caserio | 324—122 |
| 3,054,054 | 9/1962 | Donker | 116—129 |
| 3,110,882 | 11/1963 | Stuerzl | 324—122 |

RUDOLPH V. ROLINEC, *Primary Examiner.*

WALTER L. CARLSON, *Examiner.*